United States Patent
Li

(10) Patent No.: US 8,769,351 B2
(45) Date of Patent: Jul. 1, 2014

(54) MOBILE DEVICE AND METHOD FOR CORRECTING ERRORS OCCURRING IN ATTENTION COMMANDS OF THE MOBILE DEVICE

(75) Inventor: Ying-Zheng Li, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 264 days.

(21) Appl. No.: 13/370,315

(22) Filed: Feb. 10, 2012

(65) Prior Publication Data

US 2012/0278666 A1 Nov. 1, 2012

(30) Foreign Application Priority Data

Apr. 26, 2011 (CN) .......................... 2011 1 0104995

(51) Int. Cl.
*G06F 11/07* (2006.01)
(52) U.S. Cl.
USPC .......................................................... 714/55
(58) Field of Classification Search
CPC .......................... G06F 11/0724; G06F 11/0757
USPC .......................................................... 714/55
See application file for complete search history.

(56) References Cited

U.S. PATENT DOCUMENTS

| | | | |
|---|---|---|---|
| 6,356,984 B1 * | 3/2002 | Day et al. ...................... | 711/147 |
| 7,958,396 B2 * | 6/2011 | Chitsaz et al. .................. | 714/31 |
| 8,020,028 B1 * | 9/2011 | Lutter ................................ | 714/1 |
| 8,489,862 B2 * | 7/2013 | Saito et al. ...................... | 712/43 |
| 2007/0294601 A1 * | 12/2007 | Chitsaz et al. .................. | 714/55 |
| 2009/0013217 A1 * | 1/2009 | Shibata et al. .................. | 714/47 |
| 2010/0185833 A1 * | 7/2010 | Saito et al. ..................... | 712/203 |

* cited by examiner

*Primary Examiner* — Charles Ehne
(74) *Attorney, Agent, or Firm* — Novak Druce Connolly Bove + Quigg LLP

(57) ABSTRACT

In a method for correcting errors occurring in attention (AT) commands of a mobile device, the mobile device includes a first user identity module (UIM) chipset, a second UIM chipset, a buffer and a timer. The method sets a response time for a communication between the first UIM chipset and the second chipset according to an AT command, backups the AT command into the buffer, and counts a communication time using the timer. When the communication time exceeds the response time, the method restarts the first UIM chipset using a watchdog timer and restarts the second UIM chipset by resetting voltage levels of I/O pins of the second UIM chipset. The method further clears the communication data stored in the buffer, reads the AT command from the buffer and resends the AT command to control the first UIM chipset to communicate with the UIM second chipset normally.

19 Claims, 2 Drawing Sheets

MOBILE DEVICE AND METHOD FOR CORRECTING ERRORS OCCURRING IN ATTENTION COMMANDS OF THE MOBILE DEVICE

BACKGROUND

1. Technical Field

The embodiments of the present disclosure relate to mobile devices and error correction methods used in the mobile devices, and more particularly to a mobile device and a method for correcting errors occurring in attention (AT) commands of the mobile device.

2. Description of Related Art

A user identity module (UIM) is a chipset used in mobile phones, and is composed of a memory chip. Information, such as telephone numbers and network numbers, are usually stored in the memory chip of the UIM chipset. A mobile device may include one or more UIM chipsets, such as a mobile phone having a single UIM chipset or a dual UIM chipset, e.g., a first UIM chipset and a second UIM chipset. To use a dual-mode function of the mobile device, the first UIM chipset may communicate with the second UIM chipset using attention (AT) commands.

However, errors may occur when the AT commands are processed by the first UIM chipset or the second UIM chipset. In this situation, the mobile device cannot respond to the AT commands using one of the UIM chipsets, so that the dual-mode function of the mobile device is disabled. Therefore, it is desirable to have a method for correcting errors occurring in AT commands of the mobile device, to overcome the above-mentioned problems.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
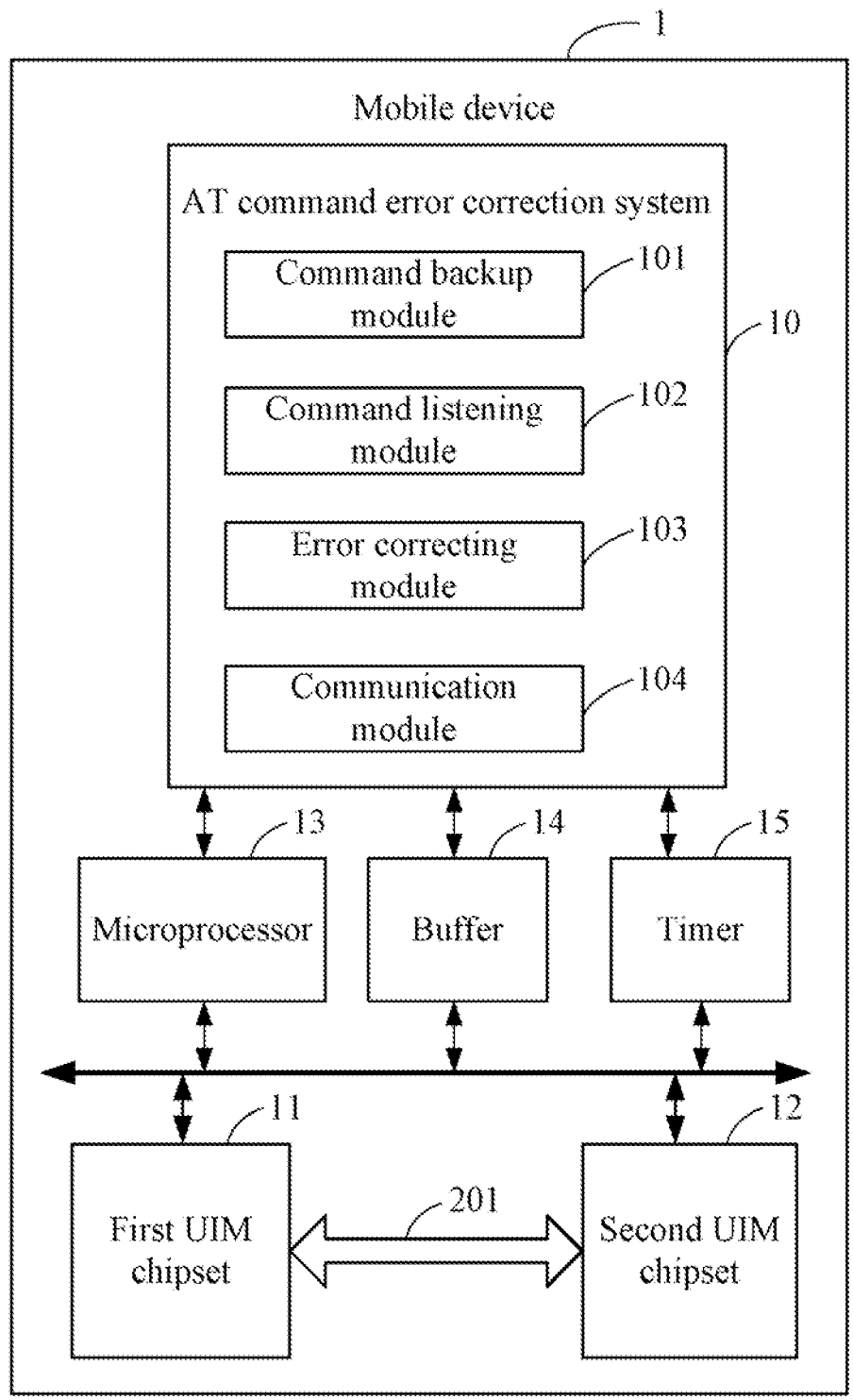
FIG. 1 is a block diagram of one embodiment of a mobile device including an AT command error correction system.

FIG. 1 is a block diagram of one embodiment of a mobile device 1 including an attention (AT) command error correction system 10. In the embodiment, the mobile device 1 may be a mobile phone, a personal digital assistant (PDA) device, or other communication devices including dual user identity module (UIM) chipsets, i.e., a first UIM chipset 11 and a second UIM chipset 12. The first UIM chipset 11 can communicate with the second UIM chipset 12 through a data transmission channel 201, such as a data serial bus, for example. In one embodiment, the camera device 1 may further include a microprocessor 13, a buffer 14, and a timer 15. Each of the components can communicate with the system 10 included in the mobile device 1 through one or more bus lines. It is understood that FIG. 1 is only one example of the mobile device 1 that includes more or fewer components than those shown in the embodiment, or have a different configuration of the various components.

In one embodiment, the first UIM chipset 11 includes a first UIM input pin and a first output pin, and the second UIM chipset includes a second UIM input pin and a second output pin. The first input pin of the first UIM chipset 11 connects to the second output pin of the second UIM 12, and the first output pin of the first UIM chipset 11 connects to the second input pin of the second UIM 12.

The AT command error correction system 10 may include a plurality of functional modules that are stored in a storage system and implemented by the microprocessor 13, and corrects errors occurring in AT commands of the mobile device 1. For example, data-bit errors may occur when the AT commands are transferred in the data transmission channel 201 between the first UIM chipset 11 and the second UIM chipset 12. In one embodiment, the storage system may be an internal storage system, such as a random access memory (RAM) for the temporary storage of information, and/or a read only memory (ROM) for the permanent storage of information. In some embodiments, the storage system may also be an external storage system, such as an external hard disk, a storage chipset, or a data storage medium.

The buffer 14 is configured to backup the AT commands when the AT commands occur errors, and temporarily store communication data. The communication data may include sent data, received data, and parsed data of the first UIM chipset 11 or the second UIM chipset 12. The timer 15 is configured to count a communication time when the first UIM chipset 11 communicates with the second UIM chipset 12.

In one embodiment, the AT command error correction system 10 includes a command backup module 101, a command listening module 102, an error correcting module 103, and a communication module 104. The modules 101-104 may comprise computerized instructions in the form of one or more programs that are stored in the storage system and executed by the microprocessor 16 to provide functions for implementing the modules. A detailed description of each module will be given in the following paragraphs.

In general, the word "module," as used herein, refers to logic embodied in hardware or firmware, or to a collection of software instructions, written in a programming language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, flash memory, and hard disk drives.

Figure 2:
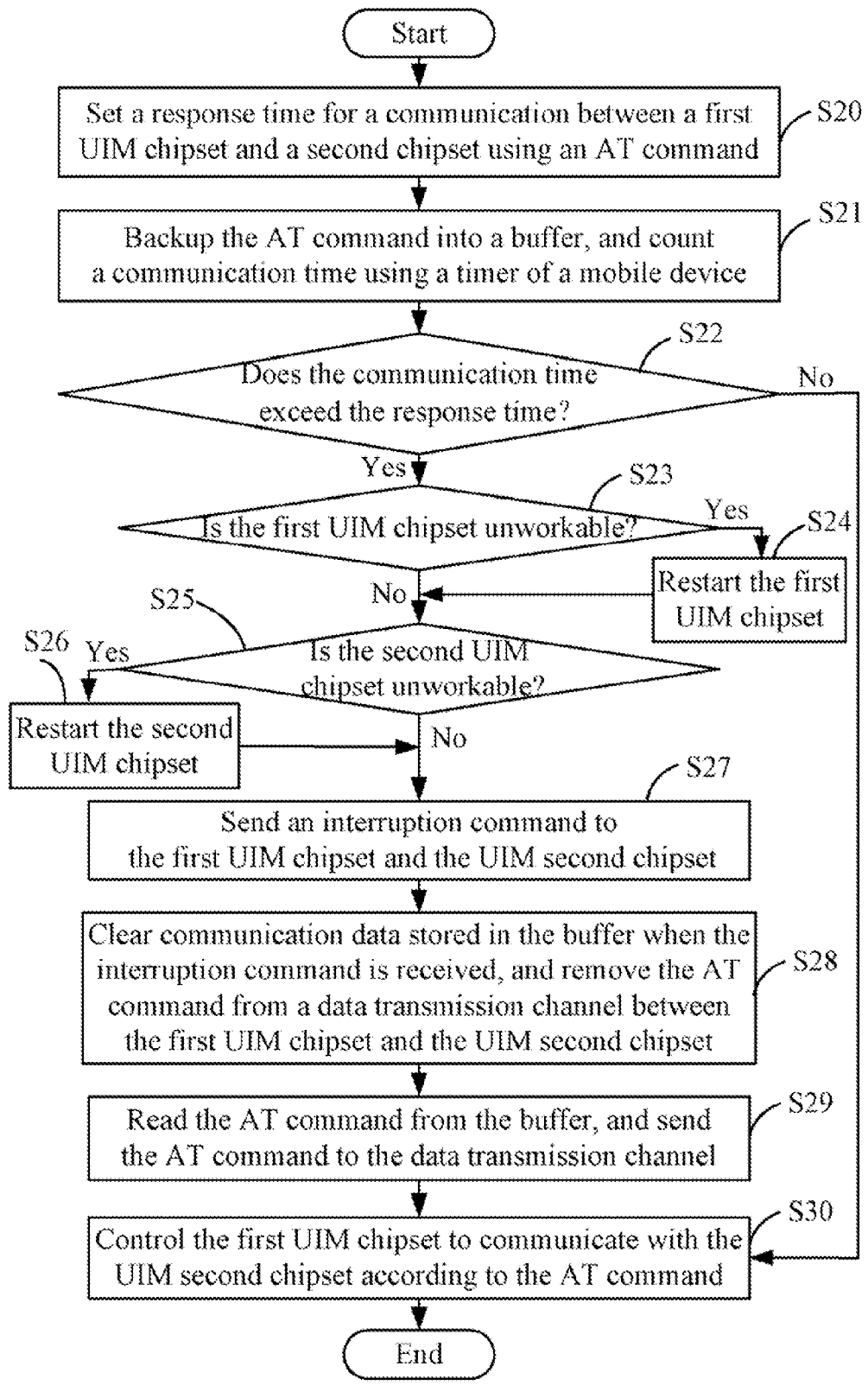
FIG. 2 is a flowchart of one embodiment of a method for correcting errors occurring in AT commands of the mobile device of FIG. 1.

FIG. 2 is a flowchart of one embodiment of a method for correcting errors occurring in AT commands of the mobile device 1 of FIG. 1. Depending on the embodiment, additional blocks may be added, others removed, and the ordering of the blocks may be changed.

In block S20, the command backup module 101 predefines a response time for a communication between the first UIM chipset 11 and the second chipset 12 according to an AT command, such as a command for request of switching a communication channel from the first UIM chipset 11 to the second chipset 12, for example. In one embodiment, the response time may be predefined as different times according to requirements of the user, such as 5 seconds, for example.

In block S21, the command backup module 101 backups the AT command into the buffer 14, and counts a communication time of the communication between the first UIM chipset 11 and the second chipset 12 using the timer 15. In the embodiment, the command backup module 101 starts the timer 15 to count the communication time when the first UIM chipset 11 sends the AT command to the data transmission channel 201.

In block S22, the command listening module 102 determines whether the communication time exceeds the response time. If the communication time exceeds the response time, block S23 is implemented. Otherwise, if the communication time exceeds the response time, block S 30 is implemented.

In block S23, the command listening module 102 checks whether the first UIM chipset 11 is unworkable according to the status of the first UIM chipset 11. If the first UIM chipset 11 is unworkable, block S24 is implemented. Otherwise, if the first UIM chipset 11 is workable, block S25 is implemented.

In block S24, the command listening module 102 restarts the first UIM chipset 11 using a watchdog timer. In one embodiment, the watchdog timer is a listening thread that monitors the communication between the first UIM chipset 11 and the second UIM chipset 12.

In block S25, the command listening module 102 determines whether the second UIM chipset 12 is unworkable by checking voltage levels of I/O pins of the second UIM chipset 12. If the second UIM chipset 12 is unworkable, block S26 is implemented. Otherwise, if the second UIM chipset 12 is workable, block S27 is implemented.

In block S26, the command listening module 102 restarts the second UIM chipset 12 by resetting the voltage levels of I/O pins of the second UIM chipset 12. In one embodiment, the command listening module 102 may reset a voltage level of the second input pin as a high voltage level "1" (e.g., 5 voltages), and reset a voltage level of the second output pin as a low voltage level "0" (e.g., 0 voltage), to restart the second UIM chipset 12.

In block S27, the error correcting module 103 generates an interruption command when both the first UIM chipset 11 and the second UIM chipset 12 is workable, and sends the interruption command to the first UIM chipset 11 and the UIM second chipset 12.

In block S28, the error correcting module 103 clears the communication data stored in the buffer 14 when the interruption command is received by the first UIM chipset 11 and the second chipset 12, and removes the AT command from the data transmission channel 201 between the first UIM chipset 11 and the second chipset 12. In one embodiment, the communication data may include sent data, received data, and parsed data of the first UIM chipset 11 or the second UIM chipset 12.

In block S29, the communication module 104 reads the backup AT command from the buffer 14, and resends the backup AT command to the data transmission channel 201. In block S30, the communication module 104 controls the first UIM chipset 11 to communicate with the UIM second chipset 12 normally according to the backup AT command.

All of the processes described above may be embodied in, and fully automated via, functional code modules executed by one or more general purpose processors of electronic devices. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A mobile device, comprising:
    a first user identity module (UIM) chipset and a second UIM chipset;
    a buffer, a timer, and a microprocessor; and
    one or more programs stored in a storage system and executed by the microprocessor, the one or more programs comprising:
    a command backup module operable to set a response time for a communication between the first UIM chipset and the second chipset according to an attention (AT) command, backup the AT command into the buffer, and count a communication time of the communication between the first UIM chipset and the second chipset using the timer;
    a command listening module operable to determine whether the communication time exceeds the response time, check whether the first UIM chipset is unworkable when the communication time exceeds the response time, restart the first UIM chipset using a watchdog timer if the first UIM chipset is unworkable, check whether the second UIM chipset is unworkable if the first UIM chipset is workable, and restart the second UIM chipset by resetting voltage levels of I/O pins of the second UIM chipset if the second UIM chipset is unworkable;
    an error correcting module operable to generate an interruption command if the second UIM chipset is workable, send the interruption command to the first UIM chipset and the UIM second chipset, and clear the communication data stored in the buffer when the interruption command is received by the first UIM chipset and the UIM second chipset; and
    a communication module operable to read the AT command from the buffer, resend the backup AT command to a data transmission channel between the first UIM chipset and the second chipset, and control the first UIM chipset to communicate with the UIM second chipset according to the AT command.

2. The mobile device according to claim 1, wherein the error correcting module is further operable to remove the AT command from the data transmission channel when the interruption command is received by the first UIM chipset and the UIM second chipset.

3. The mobile device according to claim 1, wherein the communication data comprise sent data, received data, and parsed data of the first UIM chipset or the second UIM chipset.

4. The mobile device according to claim 1, wherein the watchdog timer is a listening thread that monitors the communication between the first UIM chipset and the second UIM chipset.

5. The mobile device according to claim 1, wherein the first UIM chipset comprises a first UIM input pin and a first output pin, and the second UIM chipset comprises a second UIM input pin and a second output pin.

6. The mobile device according to claim 5, wherein the command listening module resets a voltage level of the second input pin as a high voltage level and resets a voltage level of the second first pin as a low voltage level to restart the second UIM chipset.

7. A method for correcting errors occurring in attention (AT) commands of a mobile device, the mobile device comprising a first user identity module (UIM) chipset, a second UIM chipset, a buffer and a timer, the method comprising:

setting a response time for a communication between the first UIM chipset and the second chipset according to an AT command;

backing-up the AT command into the buffer, and counting a communication time of the communication between the first UIM chipset and the second chipset using the timer;

determining whether the communication time exceeds the response time;

checking whether the first UIM chipset is unworkable when the communication time exceeds the response time;

restarting the first UIM chipset using a watchdog timer if the first UIM chipset is unworkable;

checking whether the second UIM chipset is unworkable if the first UIM chipset is workable;

restarting the second UIM chipset by resetting voltage levels of I/O pins of the second UIM chipset if the second UIM chipset is unworkable;

generating an interruption command if the second UIM chipset is workable, and sending the interruption command to the first UIM chipset and the UIM second chipset;

clearing the communication data stored in the buffer when the interruption command is received by the first UIM chipset and the UIM second chipset;

reading the AT command from the buffer and resending the backup AT command to a data transmission channel between the first UIM chipset and the second chipset; and controlling the first UIM chipset to communicate with the UIM second chipset according to the AT command.

8. The method according to claim 7, further comprising:
removing the AT command from the data transmission channel when the interruption command is received by the first UIM chipset and the UIM second chipset.

9. The method according to claim 7, wherein the communication data comprise sent data, received data, and parsed data of the first UIM chipset or the second UIM chipset.

10. The method according to claim 7, wherein the watchdog timer is a listening thread that monitors the communication between the first UIM chipset and the second UIM chipset.

11. The method according to claim 7, wherein the first UIM chipset comprises a first UIM input pin and a first output pin, and the second UIM chipset comprises a second UIM input pin and a second output pin.

12. The method according to claim 11, wherein the second UIM chipset is restarted by resetting a voltage level of the second input pin as a high voltage level and resetting a voltage level of the second first pin as a low voltage level to restart the second UIM chipset.

13. A non-transitory storage medium having stored thereon instructions that, when is executed by at least one microprocessor of a mobile device, causes the mobile device to perform a method for correcting errors occurring in attention (AT) commands, the mobile device comprising a first user identity module (UIM) chipset, a second UIM chipset, a buffer and a timer, the method comprising:

setting a response time for a communication between the first UIM chipset and the second chipset according to an AT command;

backing-up the AT command into the buffer, and counting a communication time of the communication between the first UIM chipset and the second chipset using the timer;

determining whether the communication time exceeds the response time;

checking whether the first UIM chipset is unworkable when the communication time exceeds the response time;

restarting the first UIM chipset using a watchdog timer if the first UIM chipset is unworkable;

checking whether the second UIM chipset is unworkable if the first UIM chipset is workable;

restarting the second UIM chipset by resetting voltage levels of I/O pins of the second UIM chipset if the second UIM chipset is unworkable;

generating an interruption command if the second UIM chipset is workable, and sending the interruption command to the first UIM chipset and the UIM second chipset;

clearing the communication data stored in the buffer when the interruption command is received by the first UIM chipset and the UIM second chipset;

reading the AT command from the buffer and resending the backup AT command to a data transmission channel between the first UIM chipset and the second chipset; and controlling the first UIM chipset to communicate with the UIM second chipset according to the AT command.

14. The storage medium according to claim 13, wherein the method further comprises:
removing the AT command from the data transmission channel when the interruption command is received by the first UIM chipset and the UIM second chipset.

15. The storage medium according to claim 13, wherein the communication data comprise sent data, received data, and parsed data of the first UIM chipset or the second UIM chipset.

16. The storage medium according to claim 13, wherein the watchdog timer is a listening thread that monitors the communication between the first UIM chipset and the second UIM chipset.

17. The storage medium according to claim 13, wherein the first UIM chipset comprises a first UIM input pin and a first output pin, and the second UIM chipset comprises a second UIM input pin and a second output pin.

18. The storage medium according to claim 17, wherein the second UIM chipset is restarted by resetting a voltage level of the second input pin as a high voltage level and resetting a voltage level of the second first pin as a low voltage level to restart the second UIM chipset.

19. The storage medium according to claim 13, wherein the storage medium is selected from the group consisting of a hard disk drive, a compact disc, a digital video disc, and a tape drive.

* * * * *